(12) United States Patent
Massot et al.

(10) Patent No.: US 11,365,013 B2
(45) Date of Patent: Jun. 21, 2022

(54) METHOD AND A DEVICE FOR LIMITING TORQUE ON A ROTORCRAFT HAVING AT LEAST THREE MOTORS WITH NON-EQUAL POWER DISTRIBUTION

(71) Applicant: AIRBUS HELICOPTERS, Marignane (FR)

(72) Inventors: Lucie Massot, Saint-Chamas (FR); Valerie Trouillet, Bouc Bel Air (FR)

(73) Assignee: AIRBUS HELICOPTERS, Marignane (FR)

( * ) Notice: Subject to any disclaimer, the term of this patent is extended or adjusted under 35 U.S.C. 154(b) by 577 days.

(21) Appl. No.: 16/438,991

(22) Filed: Jun. 12, 2019

(65) Prior Publication Data

US 2019/0382124 A1 Dec. 19, 2019

(30) Foreign Application Priority Data

Jun. 14, 2018 (FR) ...................................... 1800616

(51) Int. Cl.
*B64D 31/12* (2006.01)
*B64C 27/12* (2006.01)
*B64D 27/02* (2006.01)

(52) U.S. Cl.
CPC .............. *B64D 31/12* (2013.01); *B64C 27/12* (2013.01); *B64D 2027/026* (2013.01)

(58) Field of Classification Search
CPC .. B64D 31/12; B64D 2027/026; B64D 35/08; B64C 27/12; B60W 2510/0657; B60W 2710/0666; B60W 2710/083
See application file for complete search history.

(56) References Cited

U.S. PATENT DOCUMENTS

| | | |
|---|---|---|
| 3,963,372 A | 6/1976 | McLain et al. |
| 4,479,619 A | 10/1984 | Saunders et al. |
| 8,594,864 B2 | 11/2013 | Greenfield et al. |
| 9,353,642 B2 | 5/2016 | Certain |
| 9,387,934 B2 | 7/2016 | Gomez |
| 9,536,358 B2 * | 1/2017 | Germanetti ............ B64D 43/00 |
| 9,586,691 B2 | 3/2017 | Rossotto et al. |

(Continued)

FOREIGN PATENT DOCUMENTS

| | | |
|---|---|---|
| EP | 3050806 A1 | 8/2016 |
| FR | 2998542 A1 | 5/2014 |

(Continued)

OTHER PUBLICATIONS

French Search Report for French Application No. FR 1800616, Completed by the French Patent Office, dated Feb. 5, 2019, 6 pages.

*Primary Examiner* — Justin Holmes
(74) *Attorney, Agent, or Firm* — Brooks Kushman P.C.

(57) ABSTRACT

A method for limiting torque on a rotorcraft. The rotorcraft comprises an installation having a rotor, the installation including at least three motors driving a power transmission gearbox, the MGB including a rotor mast for moving the rotor. The method comprises a step of determining a engine torque limit for each of at least the three motors, each engine torque limit being established by a control computer of the aircraft by taking into consideration the distribution among the at least three motors of the total power (Ptot) delivered by the at least three motors for enabling the rotorcraft to operate.

6 Claims, 2 Drawing Sheets

(56) References Cited

U.S. PATENT DOCUMENTS

| | | | |
|---|---|---|---|
| 9,815,568 B2 | 11/2017 | Vallart et al. | |
| 10,106,268 B2 | 10/2018 | Rossotto | |
| 10,144,528 B2 | 12/2018 | Rossotto | |
| 2014/0117148 A1* | 5/2014 | Dyrla | B64D 35/08 244/17.13 |
| 2017/0341771 A1* | 11/2017 | Casolaro | B64C 27/54 |

FOREIGN PATENT DOCUMENTS

| | | | |
|---|---|---|---|
| FR | 2998543 A1 | 5/2014 | |
| FR | 3008957 A1 | 1/2015 | |
| FR | 3037923 A1 | 12/2016 | |
| FR | 3037924 A1 | 12/2016 | |

* cited by examiner

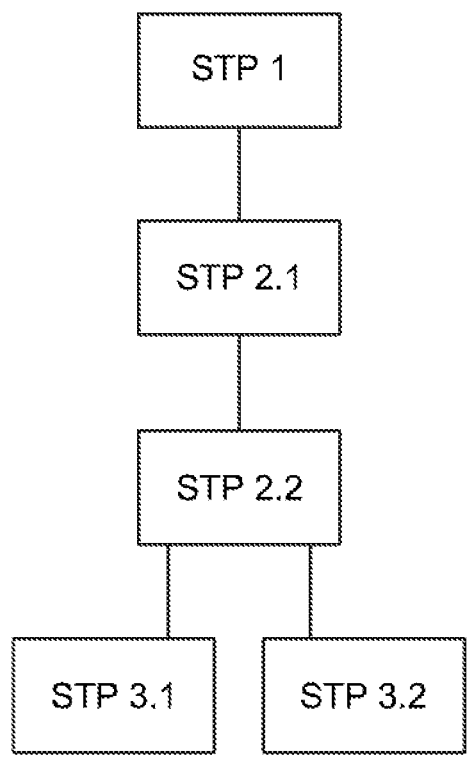

METHOD AND A DEVICE FOR LIMITING TORQUE ON A ROTORCRAFT HAVING AT LEAST THREE MOTORS WITH NON-EQUAL POWER DISTRIBUTION

CROSS-REFERENCE TO RELATED APPLICATIONS

This application claims priority to French patent application No. FR 1800616 filed on Jun. 14, 2018, the disclosure of which is incorporated in its entirety by reference herein.

BACKGROUND OF THE INVENTION

(1) Field of the Invention

The present invention relates to a method and to a device for limiting torque on a rotorcraft having at least three motors with non-equal power distribution.

(2) Description of Related Art

The invention is thus situated in the field of power plants, and more particularly in the field of power plants for aircraft.

An aircraft, and in particular a rotorcraft, may include at least one rotor contributing to providing the aircraft with propulsion and/or lift.

In order to rotate each rotor, the aircraft thus has a power plant. The power plant may comprise at least two motors serving in particular to drive a main power transmission gearbox via a drive train. This power transmission gearbox (MGB) then drives the rotor in rotation via a rotor mast.

At least one motor may be a fuel-burning engine. In particular, one motor may be a turboshaft engine. Conventionally, a turboshaft engine comprises a gas generator and at least one work-delivery turbine. The gas generator is then provided with at least one compressor, a combustion chamber, and an expansion turbine connected to the compressor. The compressor may be provided with a plurality of axial and/or centrifugal compression stages. The work-delivery turbine may be a free turbine, i.e. not constrained to rotate with the gas generator, or it may be linked to the gas generator. Furthermore, the work-delivery turbine acts directly or indirectly to drive an outlet shaft of the turboshaft engine mechanically in rotation.

A fuel-burning engine could also be a piston engine having an outlet shaft.

Another type of motor is an electric motor. Like fuel-burning engines, an electric motor has an outlet shaft.

Independently of the nature of the motor, the outlet shaft is then mechanically connected, either directly or indirectly, to an inlet shaft of a power transmission gearbox in order to drive movable elements of the power transmission gearbox. The drive train connecting a motor to a power transmission gearbox then comprises an outlet shaft for the motor and an inlet shaft of the power transmission gearbox. The drive train may optionally include an overrunning clutch or "freewheel", at least one intermediate shaft, mechanical connection members.

The operation of a motor, and for example of a turboshaft engine, is controlled by a control system. For example, a known control system is a full authority digital engine control (FADEC) system. A control system usually includes an "engine computer" connected to a fuel metering unit and to various members for measuring parameters. The fuel metering unit then allows the control system to control the rate at which fuel is transmitted to the engine.

Furthermore, a fuel-burning engine, and in particular a turboshaft engine, may be operated while implementing a plurality of power ratings, often referred to more simply as "ratings".

On a multi-engined aircraft, such ratings may include so-called "normal" ratings for application in the absence of any engine failure. Such ratings are known as all engines operating (AEO) ratings. Furthermore, such ratings may include so-called "emergency" ratings for use in the event of failure of an engine. These emergency ratings are referred to as one engine inoperative (OEI) ratings.

Thermal limitations of an engine and force limitations of the power transmission gearbox and of the main rotor serve to define limits that are not to be exceeded, at least other than in an emergency situation. The limitations of a turboshaft engine are generally monitored by means of three monitoring parameters: the speed of rotation of the gas generator of the engine, the engine torque, and the temperature of the gas at the inlet to the work-delivery turbine, referred to respectively as Ng, Cm, and T45 by the person skilled in the art.

Thus, for each engine rating, the manufacturers of the engine and of the aircraft establish limits for each monitoring parameter, which limits may be constant or may vary as a function of external conditions, specifically the external pressure P0 and the external temperature T0 present outside the aircraft.

The pilot of an aircraft must thus control the aircraft while taking the appropriate limits into consideration in order to comply with the recommendations of the engine manufacturer and to protect the moving assemblies of the aircraft.

Furthermore, the control system of an engine can control the fuel metering unit of the engine to ensure that the engine does not develop power that might exceed an engine torque limit in the engine as established in advance.

On a multi-engined rotorcraft and in order to comply with a rotor torque limit at the rotor mast, a manufacturer may define for each engine a engine torque limit for that engine that is not to be exceeded by the engine and that is equal to the rotor torque unit divided by the number of engines, each engine torque limit possibly varying as a function of the external pressure and of the external temperature. The engine torque limits of the engines are then identical regardless of the power being developed by the engines. The engines can thus be regulated so as to avoid exceeding the engine torque limit.

On a rotorcraft having at least three motors with non-equal power distribution, i.e. motors that do not deliver equal powers, the powers developed by certain motors may then be too limited for protecting the rotary assemblies and in particular the power transmission gearbox and the rotor. The performance of the aircraft can then be degraded.

Documents FR 3 008 957, FR 3 307 923, and FR 3 037 924 describe regulator systems for an aircraft with three engines and/or motors.

Documents FR 2 998 542 and FR 2 998 543 disclose aircraft with three engines and/or motors.

Document U.S. Pat. No. 4,479,619 relates to balancing the motors of an aircraft with three engines.

Documents EP 3 050 806, U.S. Pat. Nos. 3,963,372, 8,594,864, and FR 3 008 957 are also known.

BRIEF SUMMARY OF THE INVENTION

An object of the present invention is thus to propose a method and a device for managing torque limitations in a power plant having at least three motors with a non-equal power distribution. At least two of the at least three motors may have different nominal powers.

The invention provides a method of limiting mechanical torque on a rotorcraft, the rotorcraft comprising an installation having a rotor, the installation including at least three motors driving a power transmission gearbox, the power transmission gearbox including a rotor mast for moving the rotor.

Such a rotor may optionally participate in providing the rotorcraft at least with lift and/or with propulsion. By way of example, such a rotor may be a helicopter main rotor, or indeed it may be a propeller.

The method includes a step of determining an engine torque limit for each of said at least three motors, each engine torque limit being established by a control computer of the aircraft by taking into consideration the distribution among said at least three motors of the total power delivered by said at least three motors for enabling the rotorcraft to operate.

The powers developed by the motors need not be equal, with it being possible for two motors simultaneously to deliver two respective powers that are very different. The power developed by two distinct motors may be different from one motor to another because the motors are of different designs or indeed when the motors are operating in compliance with different ratings.

For example, two of the motors may deliver powers that are much greater than the power that can be delivered by a third motor. With torque limits established in the usual way, those two motors can find themselves very quickly at their torque limits.

Whatever the reason, the total power developed jointly by the motors of the installation may be distributed differently between the motors. The powers developed by the motors may be different from one motor to another and therefore they need not be equally distributed.

In the invention, the engine torque limits are not constant or merely adjustable as a function of external pressure and external temperature, but they are adapted at all calculation instants to the way the total power is distributed among the motors. The greater the fraction of the total power delivered by a motor, the higher the engine torque limit of that motor.

Thus, each motor is associated with an engine torque limit that varies as a function of how the total power is distributed among all of the motors of the installation.

The method may also include one or more of the following characteristics.

In one possibility, the step of determining an engine torque limit for each of said three motors may comprise the following steps:

determining with the control computer for each of said at least three motors a respective distribution coefficient, said distribution coefficient of each of said three motors giving the percentage of the total power to be delivered by that motor;

determining with the control computer for each of said at least three motors said associated engine torque limit by taking into consideration said associated distribution coefficient.

At each calculation instant, a distribution coefficient is determined for each motor as a function of the current flight point, or indeed the current stage of flight. On an aircraft having three motors, the powers developed by these three motors can then be determined by the following formulas:

$$P1 = alpha * Ptot$$

$$P2 = beta * Ptot$$

$$P3 = gamma * Ptot$$

where "Ptot" is the total power to be delivered, "P1" is the current power to be delivered by the first motor, "P2" is the current power to be delivered by the second motor, "P3" is the current power to be delivered by the third motor, "*" is the multiplication sign, "alpha" is the distribution coefficient of the first motor, "beta" is the distribution coefficient of the second motor, and "gamma" is the distribution coefficient of the third motor.

The sum of the distribution coefficients may be equal to 1, or to 100% when the coefficients are expressed as percentages.

Furthermore, each distribution coefficient may be determined using relationships and/or tables of values or the equivalent that are stored in the rotorcraft, e.g. in a memory of the control computer, and that have been obtained by testing, calculation, and/or simulation.

Each distribution coefficient then takes a value that can vary, e.g. as a function of flying conditions at the current instant, or more generally as a function of the stage of flight.

For example, the values of the distribution coefficients may vary as a function of the altitude of the rotorcraft and/or of the speed of the rotorcraft, . . . .

In a first implementation, the distribution coefficients are established so as to optimize the performance of the aircraft depending on some particular criterion. These distribution coefficients are thus used by the motor computers for controlling the motors and obtaining the desired distribution. Furthermore, the distribution coefficients are used for determining the engine torque limit.

By way of illustration, at least one distribution coefficient may have different values, e.g. during a stage of level flight and/or a stage of descending flight and/or a stage of climbing flight and/or a stage of turning flight and/or a stage of hovering flight, . . . . The stage of flight may be evaluated by the control computer, e.g. as a function of the speed of advance and of the altitude or the height of the rotorcraft, the computer deducing therefrom the values for the distribution coefficients.

For example, the stage of flight may be evaluated by the control computer by using a mathematical relationship having as its variables the speed of advance and the altitude of the rotorcraft, with the control computer storing in its memory the value for each distribution coefficient as a function of the stage of flight.

In another example, the value of each distribution coefficient is given by a mathematical relationship stored in the control computer, this mathematical relationship having as its variables the speed of advance and/or the altitude of the rotorcraft.

In a second implementation, the control computer determines the power being developed at each instant by each motor, possibly using at least one torque meter and a speed of rotation sensor respectively measuring the torque exerted on a shaft driven in rotation by the motor and the speed of rotation of that shaft. The control computer can deduce the distribution coefficient for each motor therefrom.

These examples are given solely by way of illustration.

Independently of the method used, the control computer determines the power distribution coefficients at each calculation iteration. The engine torque limit for each motor is then established by using at least the distribution coefficient of that motor.

This characteristic makes it possible to take into consideration a power distribution that need not be uniform between the motors and that varies as a function of the stage of flight.

In one possibility, a respective gearbox inlet torque limit may be stored for each of said at least three motors, said step of determining said engine torque limit for each of said at least three motors while taking into consideration said associated distribution coefficient possibly comprising the following steps:

determining with said control computer for each of said at least three motors an intermediate limit as a function of a stored common rotor torque limit and the associated distribution coefficient; and determining with said control computer said engine torque limit for each of said at least three motors, said engine torque limit associated with each of said at least three motors being equal to the minimum from among said the gearbox inlet torque limit allocated to the motor and said intermediate limit allocated to the motor.

By way of illustration for a rotorcraft having three motors, the control computer applies the following three relationships:

enginetorquelim1=min(motorintlim1,GBtorquelim1)

enginetorquelim2=min(motorintlim2,GBtorquelim2)

enginetorquelim3=min(motorintlim3,GBtorquelim3)

where "enginetorquelim1" represents the engine torque limit of the first motor, "motorintlim1" represents the intermediate limit allocated to that first motor, "GBtorquelim1" represents the gearbox torque limit allocated to that first motor, "enginetorquelim2" represents the engine torque limit of the second motor, "motorintlim2" represents the intermediate limit allocated to that second motor, "GBtorquelim2" represents the power transmission gearbox torque limit allocated to that second motor, "enginetorquelim3" represents the engine torque limit of the third motor, "motorintlim3" represents the intermediate limit allocated to that third motor, and "GBtorquelim3" represents the gearbox torque limit allocated to that third motor.

In one possibility, for each of said at least three motors, said intermediate limit may be obtained by applying the following generic equation:

intlim=[coef*(rotorlim*$Nr$)/($N2$)]

where "intlim" represents the intermediate limit allocated to a motor, "coef" represents the distribution coefficient allocated to the motor, "rotorlim" represents the rotor torque limit, "Nr" represents the speed of rotation of the rotor, "N2" represents a speed of rotation of an outlet shaft of the motor, "*" represents the multiplication sign, and "/" represents the division sign.

In a rotorcraft having three motors, the control computer may apply the following three equations:

intlim1=[alpha*(rotorlim*$Nr$)/($N21$)]

intlim2=[beta*(rotorlim*$Nr$)/($N22$)]

intlim3=[gamma*(rotorlim*$Nr$)/($N23$)]

where "intlim1" represents the intermediate limit allocated to a first motor, "alpha" represents the distribution coefficient allocated to the first motor, "N21" represents a speed of rotation of an outlet shaft of the first motor, "intlim2" represents the intermediate limit allocated to a second motor, "beta" represents the distribution coefficient allocated to the second motor, "N22" represents a speed of rotation of an outlet shaft of the second motor, "intlim3" represents the intermediate limit allocated to a third motor, "gamma" represents the distribution coefficient allocated to the third motor, "N23" represents a speed of rotation of an outlet shaft of the third motor, "rotorlim" represents the rotor torque limit, "Nr" represents the speed of rotation of the rotor, "*" represents the multiplication sign, and "/" represents the division sign.

In one possibility, the method may include a step of displaying an indication on an instrument relating at least to one engine torque limit.

For example, an instrument displays numerals giving the respective values of the engine torque limits.

In another example, the rotorcraft has an instrument known as a first limitation indicator (FLI). Such a first limitation instrument makes use of the torque limit in conventional manner.

In one possibility, the method may include the following steps for each of said three motors:

determining a current engine torque allocated to the motor;

using a motor computer to regulate the motor as a function of the current engine torque and of the engine torque limit allocated to the motor, and by way of example regulating the rate at which fuel is transmitted to the engine using a fuel metering unit.

Each motor computer can then restrain the motor under its control so that the current engine torque allocated to that motor does not exceed the engine torque limit allocated to the motor.

Optionally, at least one motor computer and the control computer may be portions of a single computer. Optionally, each motor computer is in communication with a centralized control computer. Optionally, each motor computer may also perform the function of a control computer.

In one possibility, the current engine torque allocated to a motor may be measured on an outlet shaft of the motor.

The invention also provides a rotorcraft, the rotorcraft comprising an installation having a rotor, said installation having at least three motors driving a power transmission gearbox, said power transmission gearbox having a rotor mast for driving rotation of said rotor.

The rotorcraft then includes a control computer configured to apply the above-described method.

BRIEF DESCRIPTION OF THE DRAWINGS

The invention and its advantages appear in greater detail from the following description of examples given by way of illustration and with reference to the accompanying figures, in which:

FIG. 2 is a diagram of the method applied.

DETAILED DESCRIPTION OF THE INVENTION

Figure 1:
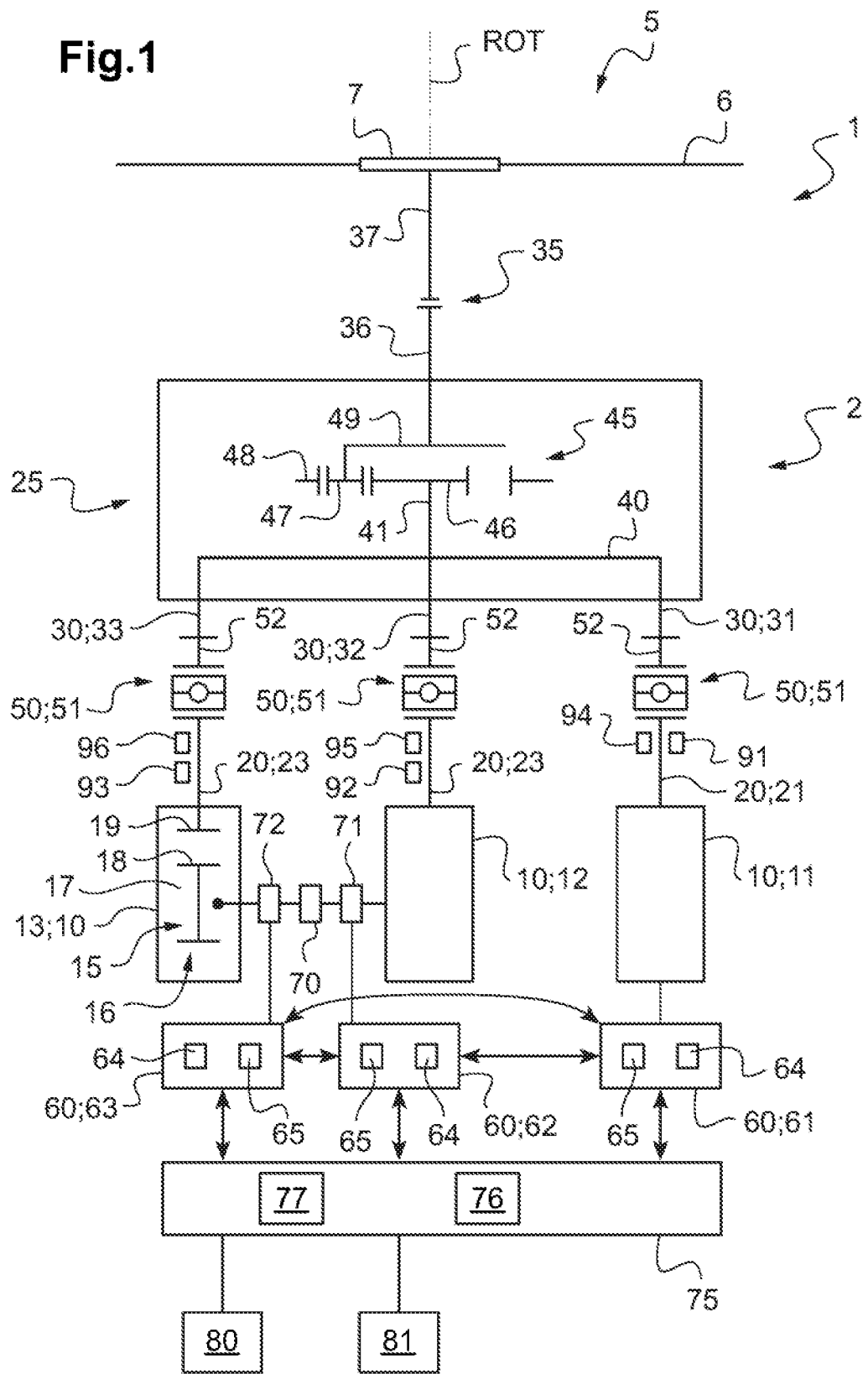
FIG. 1 is a view of a rotorcraft of the invention.

Elements present in more than one of the figures are given the same references in each of them.

FIG. 1 shows a rotorcraft 1 of the invention.

The rotorcraft 1 includes an installation 2 for providing the rotorcraft 1 with lift and possibly with propulsion. The installation 2 thus has a rotor 5. Such a rotor 5 has a plurality of blades 6 that are movable in rotation about an axis of rotation ROT of the rotor 5, the blades 6 being carried by a hub 7 or the equivalent, for example.

In order to drive the rotor 5 in rotation, the installation 2 has at least three motors 10, each having a respective outlet shaft 20, and by way of example the installation may have only three motors.

In an example, at least one motor may be an electric motor 11 comprising a member that drives an outlet shaft 21.

In another example, at least one motor may be a piston engine 12 fed with fuel from a fuel tank 70 via a fuel metering unit 71. The pistons are movable and serve to drive an outlet shaft 22.

In another example, at least one motor may be a turboshaft engine 13 fed from a fuel tank 70 via a fuel metering unit 72. Such a turboshaft engine 13 has a gas generator 15 provided with at least one compression turbine 16, a combustion chamber 17 into which the fuel is injected, and at least one expansion turbine 18 linked to a compression turbine 16. Furthermore, the turboshaft engine 13 has at least one work-delivery turbine 19 that drives an outlet shaft 23 either directly or indirectly.

Furthermore, the installation 2 has a power transmission gearbox 25 that is mechanically interposed between the motors 20 and the rotor 5. The power transmission gearbox includes a rotor mast 35 provided with one or more colinear shafts connected to the rotor 5.

The power transmission gearbox is also provided with one inlet shaft 30 per motor 20 and with various gear sets arranged between the inlet shafts 30 and the rotor mast. In an example given by way of illustration, each inlet shaft 30 engages a large wheel 40. The large wheel 40 is mechanically connected by an internal shaft 41 to a sungear 46 of a power stage 45 for reducing speed. Planet gears 47 then mesh both with the sungear 46 and with a ring gear 48. Furthermore, the planet gears 47 are carried by a planet carrier 49 constrained to rotate with the rotor mast 35.

Under such circumstances, each inlet shaft 30 is driven in rotation by an outlet shaft 20 of a motor either directly or via a drive train. For example, the three outlet shafts 21, 22, and 23 are respectively connected to three inlet shafts 31, 32, and 33 via three overrunning clutches or "freewheels" 51 and three connection shafts 52.

The literature describes various types of power transmission gearbox and various drive trains, with the example described being given purely by way of illustration.

Furthermore, the installation 2 may include one motor computer 60 per motor. By way of example, each motor computer may comprise at least one processor 64 and at least one memory 65, at least one integrated circuit, at least one programmable system, at least one logic circuit, these examples not being limiting on the scope to be given to the term "motor computer". These motor computers may communicate with one another via wired or wireless connections.

In the example described, the installation 2 has three motor computers 61, 62, and 63 respectively controlling the three motors 11, 12, and 13. With a fuel-burning engine, a motor computer may serve in particular to control the fuel-metering unit of that engine. Each motor computer may be connected to numerous sensors for monitoring the associated motor, such as for example a temperature sensor measuring the gas temperature, e.g. at the inlet to a work-delivery turbine, a speed sensor, e.g. measuring the speed of rotation of a gas generator of a turboshaft engine, a torque meter 91, 92, and 93 measuring engine torque on a rotary member, and a speed sensor 94, 95, and 96, e.g. measuring the speed of rotation of the rotary member. Such a rotary member may be an outlet shaft of a motor. More particularly, the installation may also include a torque meter measuring torque exerted on the rotor mast, a speed sensor, e.g. measuring the speed of rotation of the rotor mast, a sensor measuring external pressure, a sensor measuring external temperature, . . . .

In addition, the installation 2 includes a control computer 75. By way of example, the control computer may comprise at least one processor 76 and at least one memory 77, at least one integrated circuit, at least one programmable system, at least one logic circuit, these examples not limiting the scope to be given to the term "control computer".

The control computer may communicate via wired or wireless connections with each of the motor computers, and may possibly be combined with at least one of the motor computers. The control computer can communicate with each of the above-mentioned measurement systems. In addition, the control computer can also communicate with a system for measuring the speed of the aircraft, such as an anemometer for example, a system for measuring altitude such as a barometer system for example, or for measuring a height such as a radio altimeter, for example, . . . .

In addition, the control computer may communicate via a wired or wireless connection with at least one instrument. For example, the control computer may transmit a signal conveying engine torque limit values for each motor to a first instrument 80, with the first instrument 80 displaying these values. In another example, the control computer may transmit a signal conveying engine torque limit values for each motor to a first limit instrument 81.

In an alternative, the computer may be a component part of an instrument, e.g. a computer of a first limit instrument.

FIG. 2 shows a method that can be implemented on a rotorcraft of the type shown in FIG. 1.

In this method, the motors are to deliver jointly a total power Ptot for enabling the rotorcraft 1 to operate. The sum of the powers delivered by the motors must first be equal to the total power Ptot.

The control computer then calculates respective engine torque limits enginetorquelim1, enginetorquelim2, enginetorquelim3 for each of the motors 11, 12, 13 by making use of at least the distribution among the motors 11, 12, 13 of the total power Ptot being delivered jointly by those motors.

For this purpose, the control computer may act during a first step STP1 to calculate a respective distribution coefficient alpha, beta, gamma for each motor 11, 12, and 13, which coefficient is the image of the percentage of the total power Ptot to be delivered by that motor. For example, a first motor 21 supplying 10% of the total power is associated with a distribution coefficient equal to 10% or 0.1, a second motor 22 supplying 50% of the power is associated with a distribution coefficient equal to 50% or 0.5, and a third motor supplying 40% of the power is associated with a distribution coefficient equal to 40% or 0.4.

Each distribution coefficient may be determined using relationships and/or tables of values or the equivalent that are stored in the rotorcraft, e.g. in a memory 77 of the control computer 75. Each distribution coefficient may be variable, for example it may vary as a function of flying conditions at the current instant, or more globally as a function of the stage of flight.

In a first implementation, the distribution coefficients are established by the control computer so as to optimize the performance of the aircraft with respect to some particular criterion. These distribution coefficients or powers to be developed are then transmitted to the motor computers in order to control the motors and obtain the desired distribution.

By way of illustration, the control computer stores stages of flight, each stage of flight being associated with a pair of values for speed of advance and for altitude and with distribution coefficients to be achieved. Under such circumstances, at each calculation instant, the control computer determines the current stage of flight and deduces therefrom the distribution coefficients that are to be applied.

In a second implementation, the control computer determines the power developed at each instant by each motor, possibly by using a torque meter 91, 92, 93 and a rotary speed sensor 94, 95, 96 serving respectively to measure the torque exerted on a shaft driven by the motor and the speed of rotation of that shaft. The control computer can deduce therefrom the distribution coefficient of each motor.

During a second step STP2, the control computer 75 calculates, for each motor 11, 12, and 13, an associated engine torque limit enginetorquelim1, enginetorquelim2, enginetorquelim3 by taking into consideration the distribution coefficient alpha, beta, gamma associated with the motor.

For this purpose, the computer may take into consideration an inlet torque limit for the power transmission gearbox, GBtorquelim1, GBtorquelim2, GBtorquelim3 that is stored for each of the motors 11, 12, 13 for the purpose of protecting the power transmission gearbox. Each gearbox inlet torque limit represents a torque that is not to be exceeded at the inlet of the power transmission gearbox, and it may be constant or else it may be variable as a function of external conditions of pressure and temperature. Each gearbox inlet torque limit may be predetermined by the manufacturer, possibly by testing, simulation, calculation, . . . . Furthermore, the computer may take into consideration a rotor torque limit rotorlim that is stored and determined for protecting the rotorcraft.

Under such circumstances, the second step STP2 may comprise a first stage STP2.1 during which the control computer calculates, for each motor 11, 12, and 13, a respective intermediate limit intlim as a function of the stored rotor torque limit rotorlim and of the distribution coefficients alpha, beta, or gamma allocated to the motor.

For example, each intermediate limit intlim may be obtained by applying the following equation:

$$\text{intlim} = [\text{coef} * (\text{rotorlim} * Nr)/(N2)]$$

where "intlim" represents the intermediate limit allocated to a motor, "coef" represents the distribution coefficient allocated to the motor, "rotorlim" represents the rotor torque limit, "Nr" represents the speed of rotation of the rotor, "N2" represents a speed of rotation of an outlet shaft of the motor, "*" represents the multiplication sign, and "/" represents the division sign.

Furthermore, the second step STP2 may include a second stage STP2.2 in which the control computer calculates, for each motor 11, 12, 13, its engine torque limit enginetorquelim1, enginetorquelim2, enginetorquelim3. For example, the engine torque limit enginetorquelim1, enginetorquelim2, enginetorquelim3 allocated to a motor is equal to the minimum between the gearbox inlet torque limit of the power transmission gearbox GBtorquelim1, GBtorquelim2, GBtorquelim3 allocated to the motor and said intermediate limit intlim allocated to the motor.

The engine torque limits may be used in conventional manner.

Optionally, the method may include a display step STP3.1 for displaying an indication on an instrument 80, 81 relating at least to one of the engine torque limits enginetorquelim1, enginetorquelim2, enginetorquelim3. Such an instrument may display a value for each torque limit, or it may take account of all of the torque limits in order to determine the motor parameter that is the closest to its own limit, for example.

Optionally, in a regulation step STP3.2, the method may determine for each of the motors 11, 12, 13 a current engine torque allocated to that motor. For example, the motor computer 61, 62, 63 of a motor 11, 12, 13 determines the current engine torque being delivered by that motor. The current engine torque allocated to a motor 11, 12, 13 may be measured with a torque meter on the outlet shaft 21, 22, 23 of the motor 11, 12, 13.

Under such circumstances, each motor computer 61, 62, 63 regulates the motor under its control as a function of the current engine torque allocated to that motor and of the engine torque limit enginetorquelim1, enginetorquelim2, enginetorquelim3 allocated to that motor.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of limiting mechanical torque on a rotorcraft, the rotorcraft comprising an installation having a rotor, the installation including at least three motors driving a power transmission gearbox, the power transmission gearbox including a rotor mast for moving the rotor, wherein the method includes a step of determining an engine torque limit (enginetorquelim1, enginetorquelim2, enginetorquelim3) for each of the at least three motors, each engine torque limit (enginetorquelim1, enginetorquelim2, enginetorquelim3) being established by a control computer of the aircraft by taking into consideration a distribution among the at least three motors of the total power (Ptot) delivered by the at least three motors for enabling the rotorcraft to operate, the step of determining a engine torque limit (enginetorquelim1, enginetorquelim2, enginetorquelim3) for each of the three motors comprising the following steps:

determining (STP1) with the control computer (STP2) for each of the at least three motors a respective distribution coefficient (coef, alpha, beta, gamma), the distribution coefficient (coef, alpha, beta, gamma) of each of the three motors giving the percentage of the total power (Ptot) to be delivered by that motor;

determining with the control computer (STP2.1) for each of the at least three motors the associated engine torque limit (enginetorquelim1, enginetorquelim2, enginetorquelim3) by taking into consideration the associated distribution coefficient (coef, alpha, beta, gamma) with the following steps:

determining with the control computer (STP2.2) for each of the at least three motors an intermediate limit (intlim) as a function of a stored common rotor torque limit (rotorlim) and the associated distribution coefficient (coef, alpha, beta, gamma); and determining with the control computer the engine torque limit (enginetorquelim1, enginetorquelim2, enginetorquelim3) for each of the at least three motors, a respective gearbox inlet torque limit (GBtorquelim1, GBtorquelim2, GBtorquelim3) being stored for each of the at least three motors, the engine torque limit (enginetorquelim1, enginetorquelim2, enginetorquelim3) associated with each of the at least three motors being equal to the minimum from among the gearbox inlet torque limit (GBtorquelim1, GBtorquelim2, GBtorquelim3) allocated to the motor and the intermediate limit (intlim) allocated to the motor.

2. The method according to claim 1, wherein for each of the at least three motors, the intermediate limit (intlim) is obtained by applying the following equation:

$$intlim=[coef*(rotorlim*Nr)/(N2)]$$

where "intlim" represents the intermediate limit allocated to a motor, "coef" represents the distribution coefficient allocated to the motor, "rotorlim" represents the rotor torque limit, "Nr" represents the speed of rotation of the rotor, "N2" represents a speed of rotation of an outlet shaft of the motor, "*" represents the multiplication sign, and "/" represents the division sign.

3. The method according to claim 1, wherein the method includes a step of displaying (STP3.1) an indication on an instrument relating at least to one engine torque limit (enginetorquelim1, enginetorquelim2, enginetorquelim3).

4. The method according to claim 1, wherein the method includes, for each of the three motors, the following steps:
   determining a current engine torque allocated to the motor;
   regulating with a motor computer the motor as a function of the current engine torque and of the engine torque limit (enginetorquelim1, enginetorquelim2, enginetorquelim3) allocated to the motor.

5. The method according to claim 1, wherein the current engine torque allocated to a motor is measured on an outlet shaft of the motor.

6. A rotorcraft, the rotorcraft comprising an installation having a rotor, the installation having at least three motors driving a power transmission gearbox, the power transmission gearbox having a rotor mast for driving the rotor, wherein the rotorcraft includes a control computer configured to apply the method according to claim 1.

* * * * *